Figure 1:
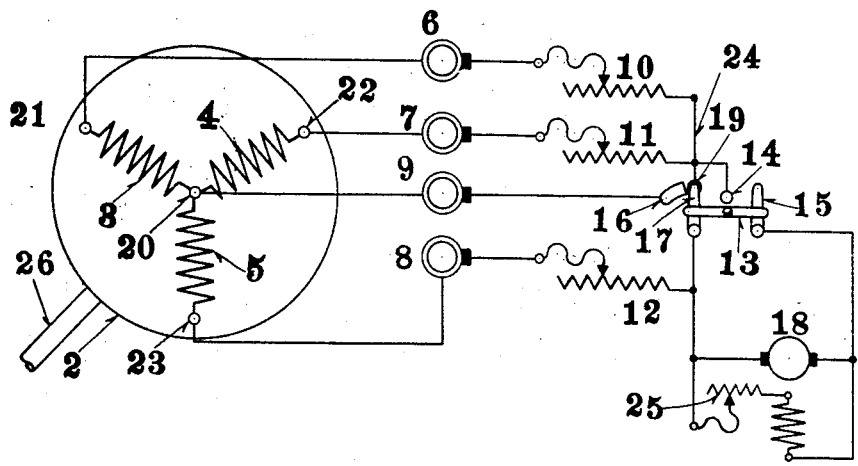

V. A. FYNN.
ALTERNATING CURRENT MOTOR.
APPLICATION FILED MAR. 15, 1918.

1,335,050.

Patented Mar. 30, 1920.

WITNESS.
Charles A. Becker

INVENTOR.
V. A. Fynn
BY E. E. Huffman
ATTORNEY.

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,335,050.   Specification of Letters Patent.   Patented Mar. 30, 1920.

Application filed March 15, 1918. Serial No. 222,558.

*To all whom it may concern:*

Be it known that I, VALÈRE A. FYNN, a subject of the King of England, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to single or polyphase alternating current motors of the induction type, and particularly to such as are provided with phase wound induced members.

In applying my invention, I short-circuit the induced member along a plurality of axes per pole pair and send continuous current through one of the short-circuited groups, preferably in such a way as to cause the axis of the unidirectional magnetization to be displaced from the axis of the magnetization produced by the short-circuit currents in said group.

For the purpose of starting such a motor, or regulating its speed, I may introduce suitable impedances in each of the phases of the induced member, while maintaining a permanent connection between the induced member and the source of continuous current, or I may connect the induced member to said source after the motor has reached a nearly synchronous speed. When a sufficiently large unidirectional magnetization is produced in the induced member, the motor is converted into a synchronous one, and the phase relation between the terminal E. M. F. and the current can be adjusted to almost any desired value by changing the magnitude of the continuous current excitation.

It has heretofore been proposed to inject into asynchronous motors a continuous current excitation after such machines had been brought up to a nearly synchronous speed. In the case of a three-phase star connected induced member, two terminals of this member were short-circuited and the continuous current source connected between these short-circuited terminals and the third terminal. Such arrangement produces a triangular distribution of the unidirectional magnetization and leaves the induced member short-circuited along a single axis per pole pair. A triangular space distribution of the magnetization is undesirable and it is not sufficient to short-circuit the induced member along a single axis per pole pair in order to secure the best asynchronous operation, or the best damping effect during the synchronous running of the machine. According to this invention both these difficulties are overcome. The space distribution of the unidirectional magnetization is trapezoidal and said member is short-circuited along two axes per pole pair, when connected to the source of continuous current.

Figure 2:
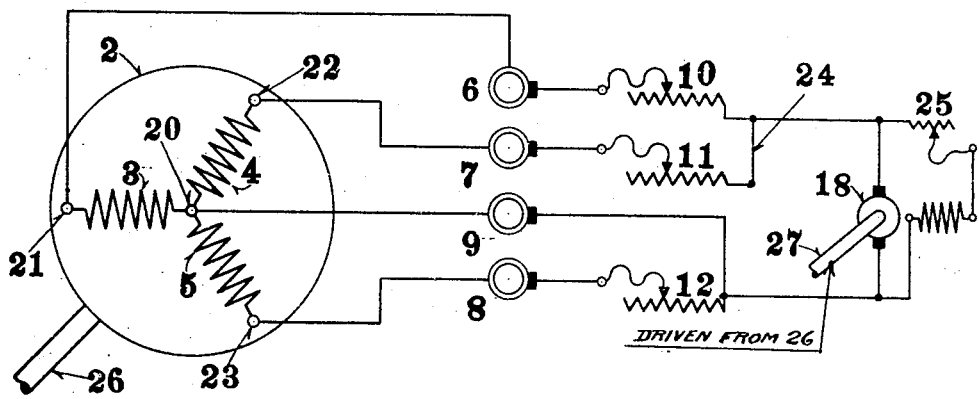

My invention will be better understood by reference to the accompanying drawings, Figure 1 of which diagrammatically illustrates one embodiment thereof, as applied to a revolving induced member, provided with a three-phase star connected winding. Fig. 2 is a modification of Fig. 1.

Referring to Fig. 1, the rotor 2 carries the three windings 3, 4, 5 displaced by 120 electrical degrees from each other, interconnected at the neutral point 20, and connected to the terminals 21, 22, 23. The neutral point is connected to the slip ring 9; the terminals 21, 22 and 23 are connected to the slip rings 6, 7 and 8 respectively. The adjustable impedances 10, 11 and 12 are connected by means of stationary brushes to the slip rings 6, 7 and 8 respectively. Ohmic rather than reactive resistances will generally be used. The slip ring 9 is connected by means of a brush to the contact 16. The adjustable resistances 10 and 11 are permanently interconnected by means of the conductor 24 and are also connected to the contacts 14 and 19. The two pole switch 13 has two blades 15, 17. In one position of this switch, the blade 17 rests on the contact 19, while the blade 15 is idle. In the other position, blade 17 rests on the contact 16 and blade 15 on the contact 14.

The continuous current shunt generator 18 provides the continuous current excitation for the rotor 2. One terminal of this generator is connected to one end of the adjustable resistance 12 and to the blade 17, while the other terminal is connected to the blade 15 of the switch 13. In the position of the switch 13 shown in the drawing, the generator 18 is not in circuit, and the adjustable resistances 10, 11 and 12 are interconnected by means of the blade 17 and the conductor 24. When the switch is moved to the left, bringing the blade 15 into contact with the terminal 14 and the blade 17 into contact with the terminal 16, then one pole of the generator 18 is connected to the neutral point 20 of the rotor, while the other pole is connected to its terminals 21 and 22, sending continuous current from point 20 to 21 and also from point 20 to point 22, or vice versa. In practice, the slip rings 6, 7, 8 and 9 would be insulatingly supported by the shaft 26 of the rotor.

The operation of this motor is somewhat as follows: Assuming the switch 13 to be placed as shown in Fig. 1 and the rotor circuits to be interrupted or closed over the maximum available resistance, the stator (which is not shown) may be connected to the line and the adjustable resistance in the rotor circuits gradually cut out as is usual, thus bringing the motor up to speed. When the machine is running at a nearly synchronous speed, the switch 13 may be moved to bring the blade 15 into contact with 14 and blade 17 into contact with 16. This movement will not interfere with the operation of the machine, particularly if the contacts 16 and 19 are placed so close together that the blade 17 makes connection with one before breaking connection with the other. In this new position of the switch 13, the machine can quite readily operate as an asynchronous motor because the phase 5 of the rotor is individually short-circuited at 16, 17, while the phases 3, and 4 of same are short-circuited in series with each other at 24. The series connected phases 3 and 4 produce an alternating magnetization displaced by 90 electrical degrees from that produced by the individually short-circuited phase 5. The distribution of the continuous current is, however, such as to produce a unidirectional magnetization along a single axis per pole pair. In this case the axis of this magnetization coincides with the axis of the phase winding 5, for the direct current traverses the phases 3 and 4 in parallel. Since a three phase winding is usually distributed over the whole pole face and since the continuous current only circulates through two phases of the three phase rotor winding, it is clear that it will not be distributed over two-thirds of the pole face and will thus produce a trapezoidal flux distribution. Whether the machine will reach a synchronous speed or not, after switch 13 has been moved to connect the continuous current source to the rotor, depends on the magnitude of the continuous current excitation. After synchronous speed has been reached, the power factor of the machine will depend on the magnitude of the unidirectional excitation. This magnitude can be adjusted, for instance by varying the shunt excitation of the generator 18 by means of the adjustable resistance 25.

The source of continuous current may be a generator such as 18 or a storage battery, or a continuous current system of distribution, or the like. When this source is a generator it can with advantage be coupled to the motor which it is designed to compensate. In such a case, the switch 13 can be dispensed with. This modification is shown in Fig. 2.

In Fig. 2 one pole of the generator is permanently connected to the adjustable resistance 12 and to the neutral point 20 of the rotor winding. The other pole is permanently connected to the conductor 24, connecting the adjustable resistances 10 and 11. In this modification it is sufficient to connect the stator to the supply and then to gradually cut out the adjustable resistances 10, 11 and 12. As the motor speeds up, the continuous current generator coupled to it will excite itself and send a compensating current into the rotor, which current can be adjusted in any known manner, thus adjusting the power factor of the machine. In Fig. 2 the shaft 27 of generator 18 is either directly coupled to the shaft 26 of the motor or geared to the same. A single adjustable resistance may be substituted for 10 and 11.

If this motor falls out of step when overloaded, it will continue to operate as an asynchronous motor, due to the fact that its induced member is always short-circuited along a plurality of axes per pole pair.

Those phases, or windings, which are to carry the direct current can be distributed over the induced member in any manner which will give the most suitable distribution of the unidirectional magnetization just so they consist of a plurality of groups with displaced axes. Thus in a three-phase rotor winding each of the phases carrying direct current may be distributed over more or less than one-third of a pole pitch, and the conductors of each phase need not be evenly distributed along the arc of the induced member occupied by said phase.

Having fully described my invention, what I claim as new and desire to secure by Letters Patent of the United States is:

1. In an alternating current motor, an induced member, a winding on the induced member, means for short-circuiting the induced member along a plurality of axes per pole pair, and means for producing in one of the short-circuits a unidirectional magnetization whose axis is displaced from that of said short-circuit.

2. In an alternating current motor, an induced member provided with a polyphase winding connected to short-circuit the induced member along a plurality of axes per pole pair, and means for utilizing one of the short-circuits to produce a unidirectional magnetization whose axis is displaced from the axis of the alternating current magnetization produced by the said short-circuit.

3. In an alternating current motor, an induced member provided with a three-phase star connected winding, means for individually short-circuiting one of the phases, means for short-circuiting the other two phases in series with each other, and a source of continuous current having one terminal connected to the neutral point of the winding on the induced member and the other terminal connected to the interconnected terminals of the two phases which are short-circuited in series.

4. In an alternating current motor, an induced member provided with two groups of windings short-circuiting said member along two axes per pole pair, and means for utilizing one of said groups to produce a unidirectional magnetization.

5. In an alternating current motor, an induced member short-circuited along two axes per pole pair, and means for producing in one of the short-circuits a unidirectional magnetization coaxial with the alternating magnetization produced by the other short-circuit.

6. In an alternating current motor, an induced member provided with a polyphase winding, an adjustable impedance in circuit with one phase of said winding, means for connecting the polyphase winding to short-circuit the induced member along a plurality of axes per pole pair, and a source of continuous current permanently connected to a part at least of the polyphase winding to produce a unidirectional magnetization.

7. In an alternating current motor, an induced member provided with a polyphase winding, an adjustable impedance in circuit with one phase of said winding, means for connecting the polyphase winding to short-cuit the induced member along a plurality of axes per pole pair, and a direct current generator driven from the motor and permanently connected to a part at least of the polyphase winding.

In testimony whereof, I have hereunto set my hand and affixed my seal.

VALÈRE A. FYNN. [L. S.]